US011953900B2

(12) United States Patent  
Otsuki et al.

(10) Patent No.: US 11,953,900 B2  
(45) Date of Patent: Apr. 9, 2024

(54) SERVICE MANAGEMENT DEVICE

(71) Applicant: TOYOTA JIDOSHA KABUSHIKI KAISHA, Toyota (JP)

(72) Inventors: Nobuhisa Otsuki, Toyota (JP); Kunihiro Iwamoto, Nagakute (JP); Haeyeon Lee, Tokyo-to (JP); Wataru Kaku, Musashino (JP); Kota Oishi, Yokohama (JP)

(73) Assignee: TOYOTA JIDOSHA KABUSHIKI KAISHA, Toyota (JP)

(*) Notice: Subject to any disclaimer, the term of this patent is extended or adjusted under 35 U.S.C. 154(b) by 29 days.

(21) Appl. No.: 17/490,114

(22) Filed: Sep. 30, 2021

(65) Prior Publication Data

US 2022/0107636 A1 Apr. 7, 2022

(30) Foreign Application Priority Data

Oct. 2, 2020 (JP) .................................. 2020-168063

(51) Int. Cl.
*G05D 1/00* (2006.01)
*G05D 1/02* (2020.01)

(52) U.S. Cl.
CPC ......... *G05D 1/0044* (2013.01); *G05D 1/0016* (2013.01); *G05D 1/0038* (2013.01); *G05D 2201/0216* (2013.01)

(58) Field of Classification Search
CPC .. G05D 1/0044; G05D 1/0016; G05D 1/0038; G05D 2201/0216; G06Q 10/0631; G06Q 10/0637; G06Q 50/28; G06Q 50/30; G06Q 10/083; G01C 21/3469; G01C 21/3461; G01C 21/3492; G01C 21/3691; G01C 21/3697

See application file for complete search history.

(56) References Cited

U.S. PATENT DOCUMENTS

2014/0136414 A1* 5/2014 Abhyanker .......... G05D 1/0011
701/25
2019/0084161 A1 3/2019 Tokuhashi et al.
(Continued)

FOREIGN PATENT DOCUMENTS

JP 2006048398 A * 2/2006
JP 2016-133945 A 7/2016
(Continued)

OTHER PUBLICATIONS

Machine Translation JP-2006048398-A (year:2006).*
(Continued)

*Primary Examiner* — Anne Marie Antonucci
*Assistant Examiner* — Lidia Kwiatkowska
(74) *Attorney, Agent, or Firm* — Dickinson Wright, PLLC

(57) ABSTRACT

A service management device manages a service delivered in a predetermined area. The service management device has an operator interface including a display that displays information for an operator and receiving an input from the operator. The service management device communicates with an autonomous robot used for delivering the service in the predetermined area to acquire, from the autonomous robot, service robot information indicating at least a position and a status of the autonomous robot. The service management device displays a map of the predetermined area and the position of the autonomous robot on the display, based on the service robot information. When the autonomous robot displayed on the display is specified by the operator through the operator interface, the service management device displays a status window indicating the status of the autonomous robot specified by the operator on the display, based on the service robot information.

5 Claims, 16 Drawing Sheets

(56) References Cited

U.S. PATENT DOCUMENTS

| | | | |
|---|---|---|---|
| 2020/0225673 A1* | 7/2020 | Ebrahimi Afrouzi | ........................ G05D 1/0044 |
| 2020/0272154 A1 | 8/2020 | Bearup et al. | |
| 2020/0272990 A1 | 8/2020 | Dogishi et al. | |
| 2020/0298882 A1* | 9/2020 | Kobayashi | ........ B60W 60/0025 |

FOREIGN PATENT DOCUMENTS

| | | | |
|---|---|---|---|
| JP | 2019-054409 A | 4/2019 | |
| JP | 2019153017 A | 9/2019 | |
| JP | 2020140245 A | 9/2020 | |
| WO | 2012/054539 A2 | 4/2012 | |
| WO | 2017090800 A1 | 6/2017 | |

OTHER PUBLICATIONS

Wikipedia: "Starship Technologies", Internet Article, Aug. 3, 2020 (Aug. 3, 2020), XP055886505, Retrieved from the Internet: URL:https://en.wikipedia.org/w/index.php?title=Starship_Technologies&oldid=970952901 [retrieved on Feb. 2, 2022].

Gunter Ullrich et al: "Automated Guided Vehicle Systems: A Primer with Practical Applications", Dec. 24, 2014 (Dec. 24, 2014), Springer, XP055619722, ISBN: 978-3-662-44813-7.

* cited by examiner

Simulator I/F for Operator Layout

US 11,953,900 B2

SERVICE MANAGEMENT DEVICE

BACKGROUND

Technical Field

The present disclosure relates to a service management device that manages a service delivered in a predetermined area.

Background Art

Patent Literature 1 discloses a logistics management system. The logistics management system includes an autonomous vehicle and a server device. The autonomous vehicle stores first management information including an inventory level of merchandise. The server device stores second management information including merchandise demand forecast information. The autonomous vehicle sets a merchandise offer price based on the first management information and the second management information.

Patent Literature 2 discloses a simulator for estimating availability of a service system composed of a plurality of services. In ease of a service failure, at least one of a processing content and a request destination of a service that depends on the failed service is changed.

LIST OF RELATED ART

Patent Literature 1: Japanese Laid-Open Patent Application Publication No. 2020-140245
Patent Literature 2: Japanese Laid-Open Patent Application Publication No. 2019-153017

SUMMARY

To develop services such as a logistics service in a predetermined area such as a certain city by utilizing an autonomous robot is one of important issues in a future society. An object of the present disclosure is to provide a technique for managing a service that is delivered in a predetermined area by utilizing an autonomous robot.

An aspect of the present disclosure is directed to a service management device that manages a service delivered in a predetermined area.

The service management device includes:
an operator interface including a display that displays information for an operator and receiving an input from the operator; and
one or more processors configured to display, on the display, an operating status of the service delivered in the predetermined area.

The one or more processors communicate with an autonomous robot used for delivering the service in the predetermined area to acquire, from the autonomous robot, service robot information indicating at least a position and a status of the autonomous robot.

The one or more processors display a map of the predetermined area and the position of the autonomous robot on the display, based on the service robot information.

When the autonomous robot displayed on the display is specified by the operator through the operator interface, the one or more processors display a status window indicating the status of the autonomous robot specified by the operator on the display, based on the service robot information.

According to the present disclosure, information on the service delivered in the predetermined area by utilizing the autonomous robot is displayed on the display. In particular, the map of the predetermined area and the position of the autonomous robot are displayed on the display. In addition, when the autonomous robot displayed on the display is specified by the operator, the status window indicating the status of the specified autonomous robot is displayed on the display. In this manner, the operator is able to easily understand the operating status of the service in the predetermined area.

EMBODIMENTS

Embodiments of the present disclosure will be described with reference to the accompanying drawings.

1. Service Delivery System

Figure 1:
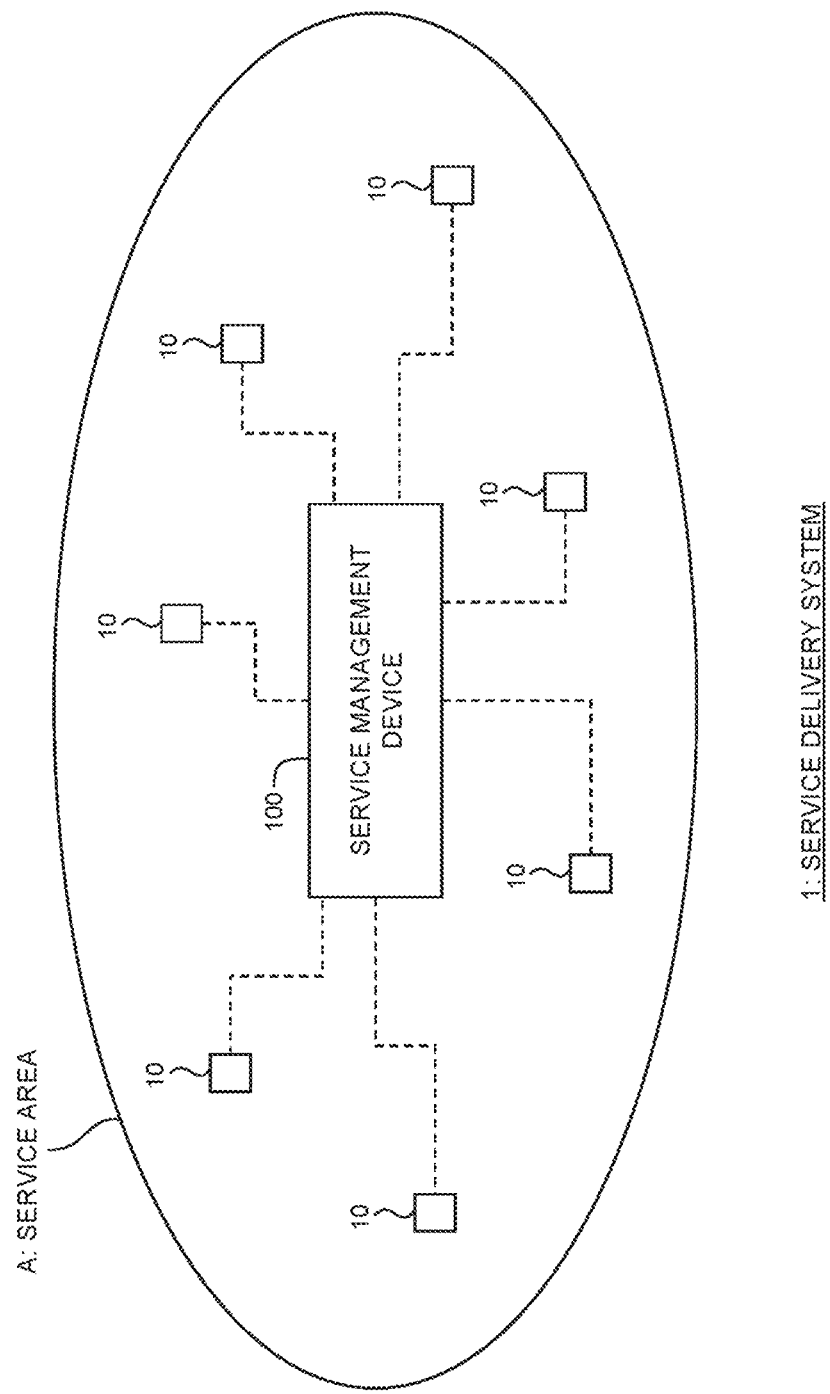
FIG. 1 is a conceptual diagram schematically showing a service delivery system according to an embodiment of the present disclosure.

FIG. 1 is a conceptual diagram schematically showing a service delivery system 1 according to the present embodiment. The service delivery system 1 delivers (provide) a service in a predetermined area such as a certain city. The area in which the service is delivered is hereinafter referred to as a "service area A." Examples of the service delivered in the service area A include a logistics service and a mobility service.

In the present embodiment, an autonomous robot 10 is utilized for delivering the service in the service area A. The autonomous robot 10 has an autonomous travel function. The autonomous robot 10 utilized for the logistics service is a logistics robot capable of autonomous traveling. The autonomous robot 10 utilized for the mobility service is an autonomous vehicle.

Typically, the autonomous robot 10 includes wheels, motors for driving the wheels, a battery for supplying power to the motors, and a control device for controlling the motors. Acceleration and deceleration of the autonomous robot 10 are performed by controlling the motors. Braking may be performed by the use of regenerative braking by control of the motors. At least one of the wheels may be provided with a mechanical brake. Turning of the autonomous robot 10 can be realized by controlling a difference in rotation speed between the left and right wheels (motors). As another example, a steering mechanism for steering the wheels may be provided.

In addition, the autonomous robot 10 has a localization function that localizes its own position and orientation. The localization function is implemented, for example, by a position sensor such as a GNSS (Global Navigation Satellite System) receiver.

Moreover, the autonomous robot 10 has a status detection function that detects its own status. Examples of the status of the autonomous robot 10 include a wheel speed, a speed, an acceleration (a longitudinal acceleration, a lateral acceleration, and the like), an angular velocity (a yaw rate, and the like), a loading weight, a remaining battery level, an error status, a failure status, and the like. Such the status of the autonomous robot 10 is detected by a status sensor installed on the autonomous robot 10.

Further, the autonomous robot 10 has a recognition (perception) function that recognizes a surrounding situation. The recognition function is implemented by a recognition sensor such as a camera, a LIDAR (Light Detection And Ranging), a radar, a sonar, and the like.

Furthermore, the autonomous robot 10 has a communication function. For example, the autonomous robot 10 communicates with a service managing device 100 through a wireless communication network such as 4G, 5G, and the like. The autonomous robot 10 may be connected to a wireless LAN. The autonomous robot 10 may perform a near field communication with another autonomous robot 10 nearby. Examples of the near field communication system include infrared communication, Bluetooth (registered trademark), and the like.

The service delivery system 1 includes a service management device 100 (management server) in addition to a plurality of autonomous robots 10. The service management device 100 manages the autonomous robots 10 and the entire service. For example, the service management device 100 is installed in an operator room. The service management device 100 is capable of communicating with each autonomous robot 10. The service management device 100 collects various types of information from each autonomous robot 10 through communication.

Figure 2:
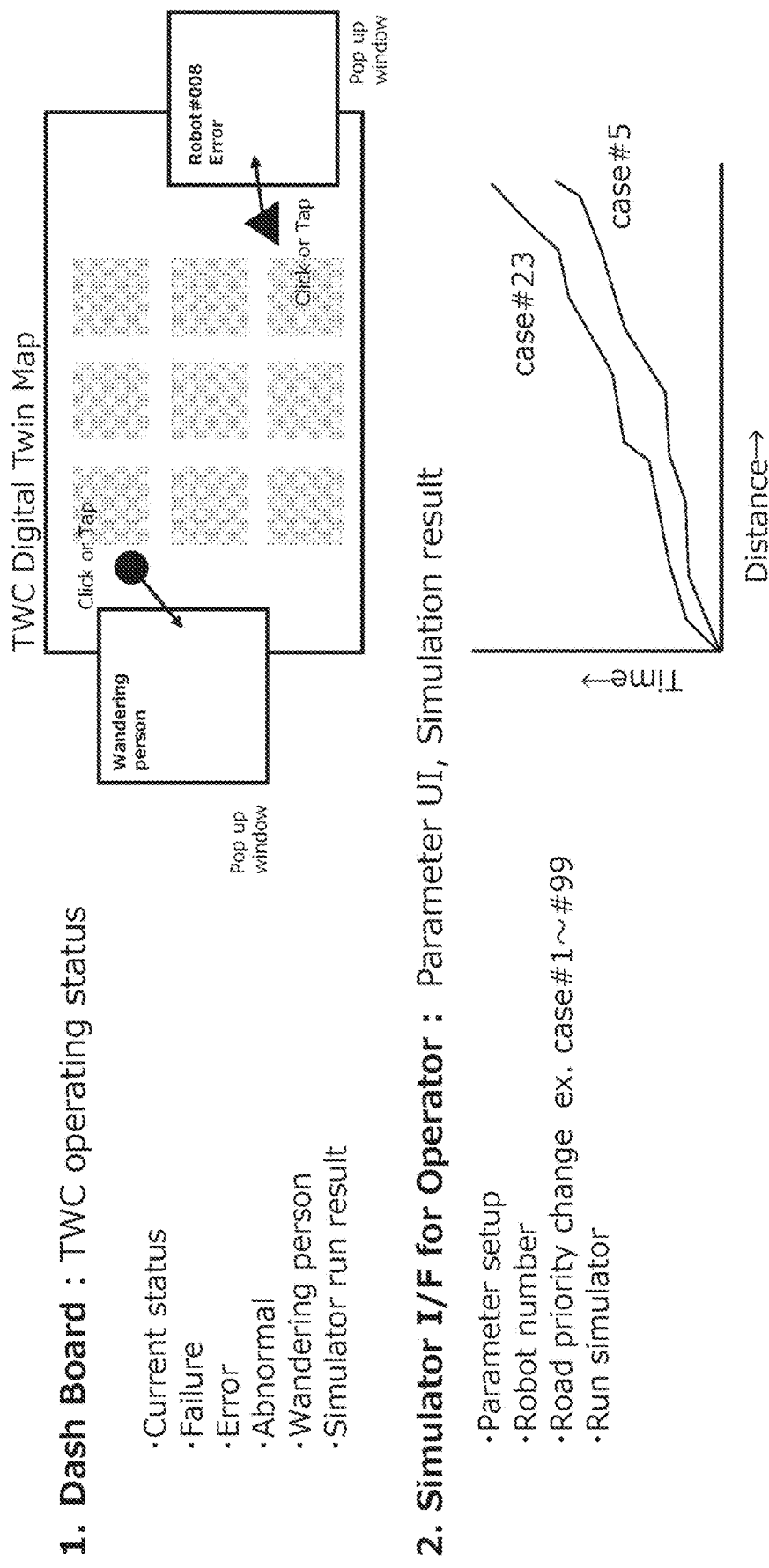
FIG. 2 is a conceptual diagram for explaining an outline of functions of a service management device according to an embodiment of the present disclosure.

FIG. 2 is a conceptual diagram for explaining an outline of functions of the service management device 100 according to the present embodiment. The service management device 100 has two main functions.

The first one is a "dashboard function." The dashboard function provides a user interface for an operator of the service. More specifically, the dashboard function provides the operator with a variety of information about the service in the service area A, and receives an input from the operator. For example, the dashboard function displays an operating status of the service delivered in the service area A on a display device. The operator is able to understand and monitor the operating status of the service in the service area A based on the information displayed on the display device. When the operator specifies a point of concern in the service area A, the dashboard function may display detailed information about the specified point on the display device. For example, the dashboard function displays detailed information by using a pop-up window. Thus, the operator is able to easily know the detailed information.

The second one is a "simulator function." The simulator function performs a simulation of the service delivered in the service area A. For example, the simulator function performs a multi-agent simulation of autonomous travel of a plurality of autonomous robots 10 in the service area A. Moreover, the simulator function displays, on the display device, a simulation setting screen used by the operator to specify a simulation condition. The operator is able to freely set the simulation condition through the simulation setting screen. The simulator function performs the simulation in accordance with the simulation condition specified by the operator. Then, the simulator function displays the simulation result on the display device. Based on the simulation result, the operator is able to analyze and consider the service delivered in the service area A. In addition, the operator is able to change the simulation condition as necessary.

Hereinafter, the service management device 100 according to the present embodiment will be described in more detail.

2. Configuration Example of Service Management Device

Figure 3:
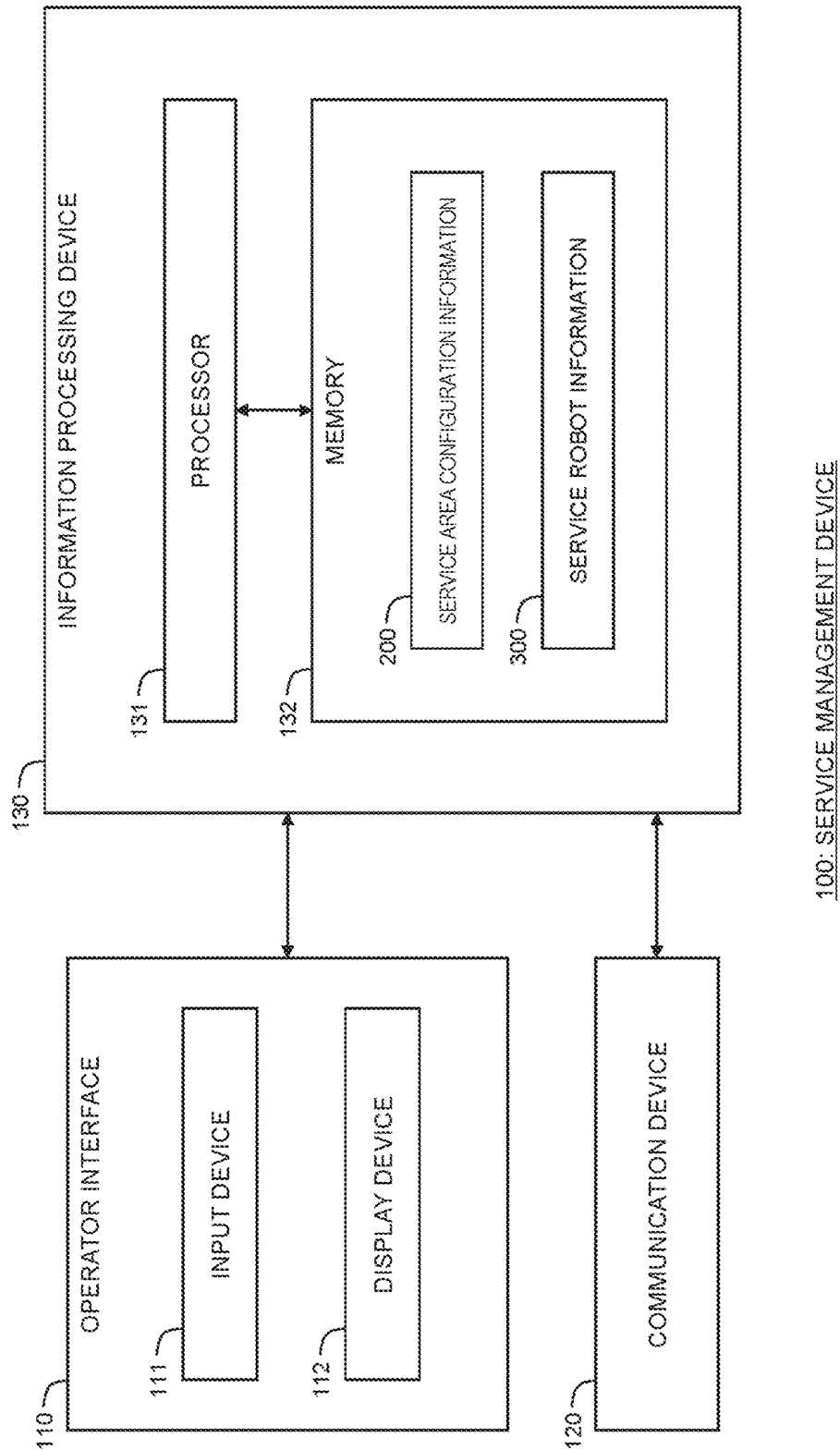
FIG. 3 is a block diagram showing a configuration example of the service management device according to an embodiment of the present disclosure.

FIG. 3 is a block diagram showing a configuration example of the service management device 100 according to the present embodiment. The service management device 100 may be a single management server or may be a plurality of management servers (distributed servers) that perform distributed processing. The service management device 100 includes an operator interface 110, a communication device 120, and an information processing device 130.

The operator interface 110 is an interface that provides the operator with a variety of information and receives an input from the operator. The operator interface 110 includes an input device and a display device 112. The input device 111 is used by the operator when inputting information. Examples of the input device 111 include a keyboard, a mouse, a touch panel, a switch, a microphone, and the like. The display device 112 displays information for the operator. Examples of the display device 112 include a touch panel, a liquid crystal display, an organic EL display, and the like. The operator interface 110 may further include a speaker.

The communication device 120 performs a communication with the outside. For example, the communication device 120 communicates with each autonomous robot 10 through a wireless communication network such as 4G, 5G, and the like. The communication device 120 may be connected to a wireless LAN.

The information processing device 130 is a computer that executes a variety of information processing. For example, the information processing device 130 includes one or more processors 131 and one or more memories 132. The processor 131 executes a variety of information processing. For example, the processor 131 includes a CPU (Central Processing Unit). The memory 132 stores a variety of information that is necessary for the processing by the processor 131. Examples of the memory 132 include a volatile memory, a non-volatile memory, an HDD (Hard Disk Drive), an SSD (Solid Status Drive), and the like. The function of the information processing device 130 is implemented by the processor 131 executing a computer program. The computer program is stored in the memory 132. The computer program may be recorded on a computer readable recording medium. The computer program may be provided via a network.

Service area configuration information 200 indicates a configuration of the service area A in which the service is delivered. The service area configuration information 200 includes a map of the service area A, a road layout, a building layout, a floor configuration in the building, a room layout in each floor, an elevator layout, and the like. Such the service area configuration information 200 is beforehand generated and provided. The information processing device 130 acquires the service area configuration information 200 and stores the service area configuration information 200 in the memory 132.

Service robot information 300 is information about each autonomous robot 10. For example, the service robot information 300 is first acquired by each autonomous robot 10. The information processing device 130 communicates with each autonomous robot 10 through the communication device 120, thereby acquiring the service robot information 300 from each autonomous robot 10. Then, the information processing device 130 stores the acquired service robot information 300 in the memory 132.

The service robot information 300 includes position status information indicating a position and a status of the autonomous robot 10. The position status information is acquired by the localization function and the status detection function of the autonomous robot 10 described above. Examples of the status of the autonomous robot 10 include a wheel speed, a speed, an acceleration, an angular velocity, a loading weight, a remaining battery level, an error status, a failure status, and the like.

Moreover, the service robot information 300 may include surrounding situation information indicating a situation around the autonomous robot 10. The surrounding situation information is acquired by the recognition function of the autonomous robot 10 described above. For example, the autonomous robot 10 is equipped with a camera that images the surrounding situation. The surrounding situation information may include an image (video) captured by the camera of the autonomous robot 10.

Furthermore, the service robot information 300 may include performance information indicating performance of each autonomous robot 10. The performance information includes a size, a package storage capacity, a maximum loading weight, a battery capacity, a maximum travel range, a maximum travel speed, and the like of the autonomous robot 10. The performance information is generated in advance for each autonomous robot 10.

Figure 4:
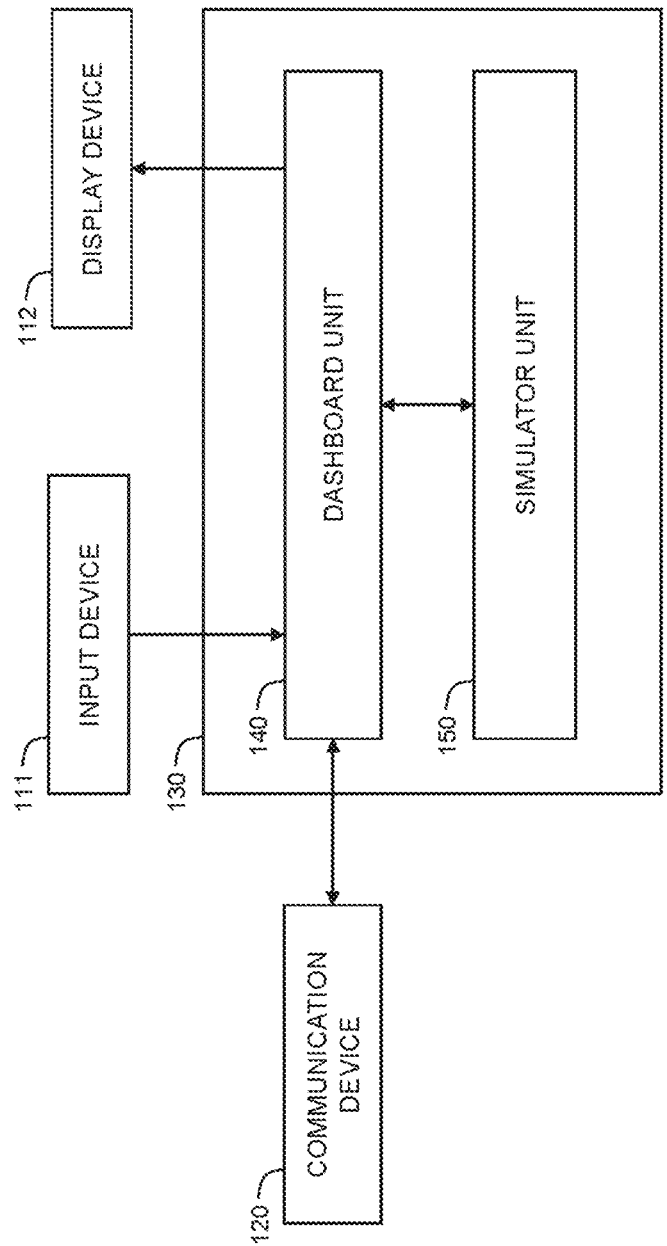
FIG. 4 is a block diagram showing a functional configuration example of the service management device according to an embodiment of the present disclosure.

FIG. 4 is a block diagram showing a functional configuration example of the service management device 100 according to the present embodiment. The information processing device 130 includes a dashboard unit 140 and a simulator unit 150 as functional blocks. These functional blocks are implemented by the one or more processors 131 executing the computer program stored in the one or more memories 132.

The dashboard unit 140 provides the "dashboard function" of the service management device 100. More specifically, the dashboard unit 140 receives information input by the operator through the input device 111. In addition, the dashboard unit 140 displays a variety of information for the operator on the display device 112. Furthermore, the dashboard unit 140 acquires the service robot information 300 from the autonomous robot 10 through the communication device 120.

The simulator unit 150 provides the "simulator function" of the service management device 100. The simulator unit 150 performs a simulation of the service delivered in the service area A. More specifically, the simulator unit 150 displays, on the display device 112 through the dashboard unit 140, a simulation setting screen used by the operator to specify a simulation condition. Moreover, the simulator unit 150 receives the simulation condition specified by the operator through the dashboard unit 140. Then, the simulator unit 150 performs the simulation in accordance with the simulation condition specified by the operator. Furthermore, the simulator unit 150 displays the simulation result on the display device 112 through the dashboard unit 140.

Hereinafter, the dashboard function and the simulator function of the service management device 100 according to the present embodiment will be described in more detail.

3. Dashboard Function of Service Management Device

The information processing device 130 (the dashboard unit 140) displays a variety of information on the display device 112. In particular, the information processing device 130 communicates with the autonomous robot 10 in the service area A to acquire the service robot information 300 in real time. Then, based on the service robot information 300, the information processing device 130 displays the operating status of the service in the service area A on the display device 112. Thus, the operator is able to understand and monitor the operating status of the service in the service area A.

As an example of the service, a logistics service is considered hereinafter. Examples of the logistics service include a package delivery service, a food delivery service, a laundry service, a garbage collection service, and so forth.

The autonomous robot 10 used for the logistics service is a logistics robot capable of autonomous traveling.

Figure 5:
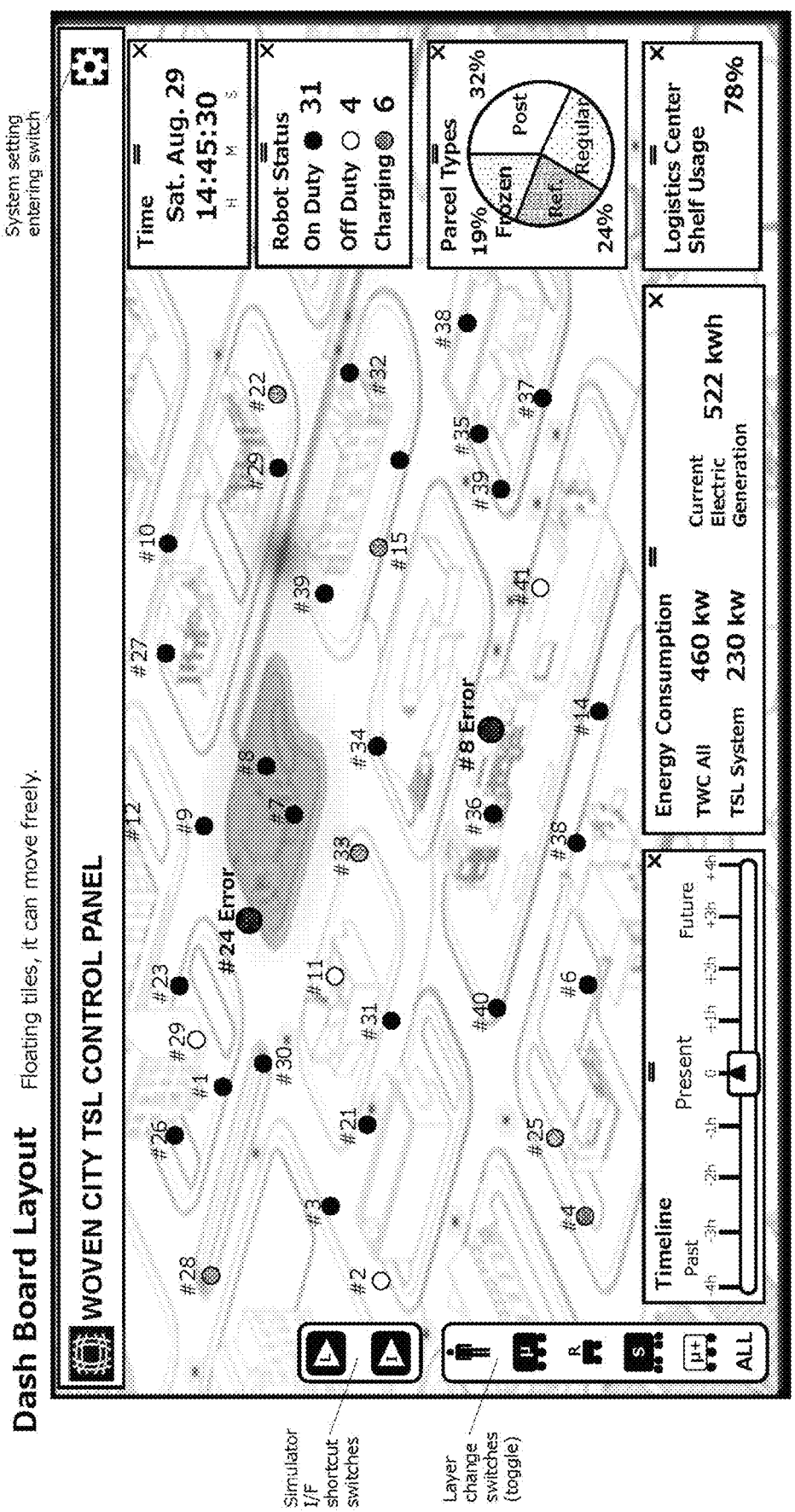
FIG. 5 is a conceptual diagram for explaining an example of a dashboard function of the service management device according to an embodiment of the present disclosure.

FIG. 5 is a conceptual diagram for explaining an example of the dashboard function. The information processing device 130 displays the position of each autonomous robot 10 in real time based on the service robot information 300. More specifically, the information processing device 130 superposes and displays the map of the service area A and the position of each autonomous robot 10 on the display device 112. The map of the service area A is obtained from the service area configuration information 200. The map may be a schematic map or may be a detailed map. In the example shown in FIG. 5, a circle on the map represents the position of each autonomous robot 10, and a number near the circle represents an ID number of each autonomous robot 10. A color and a pattern of the circle may be different for each operating status (e.g., On Duty, Off Duty, Charging) of the autonomous robot 10.

The information processing device 130 may highlight the autonomous robot 10 that is in an error status. For example, the information processing device 130 indicates the autonomous robot 10 in the error status by a large red circle. A text "Error" may be displayed together. Thus, the operator is able to easily understand presence of the autonomous robot 10 in the error status and its position.

A type of the autonomous robot 10 is not limited to one. Multiple types of autonomous robot 10 may be utilized. For example, small, medium, and large autonomous robots 10 are utilized. The information processing device 130 may display "layer change switches" used for switching the type of the autonomous robot 10 to be displayed on the display device 112. Using the layer change switches makes it possible for the operator to freely switch the autonomous robot 10 to be displayed on the display device 112.

Moreover, as shown in FIG. 5, the information processing device 130 may display a variety of panels on the display device 112. For example, a panel indicating date and time is displayed. As another example, a panel indicating a distribution of the operating statuses (e.g., On Duty, Off Duty, Charging) of a plurality of autonomous robots 10 is displayed. As yet another example, a panel indicating a distribution of types of packages (e.g., regular, refrigerated, frozen, etc.) being delivered by a plurality of autonomous robots 10 (logistics robots) is displayed. As still another example, a panel indicating a shelf usage of a logistics center is displayed. As yet another example, a panel indicating energy consumption in the service area A is displayed. The panel may be displayed and superposed on the map of the service area A. In addition, the operator can close an unnecessary panel.

In addition, the information processing device 130 may display, on the display device 112, a "simulation select switch" used for switching to the simulator function to be described later. The operator is able to easily switch to the simulator function by the use of the simulation select switch.

When the simulation is performed by the simulator function, the information processing device 130 displays a result of the simulation on the display device 112. The operator is able to study and analyze the simulation result displayed on the display device 112.

The information processing device 130 may display a "timeline change bar" used for changing the time of the information (i.e., the operating status of the service area A) displayed on the display device 112. Future information is acquired from the simulation result. The operator is able to freely change the time of the information displayed on the display device 112 by the use of the timeline change bar.

When desiring to know detailed information of an object (e.g., autonomous robot 10, building, and the like) displayed on the display device 112, the operator specifies (selects) the target object. For example, the operator can specify the target object by using the input device 111 to click or tap the target object being displayed. The information processing device 130 displays detailed information of the object specified by the operator.

Figure 6:
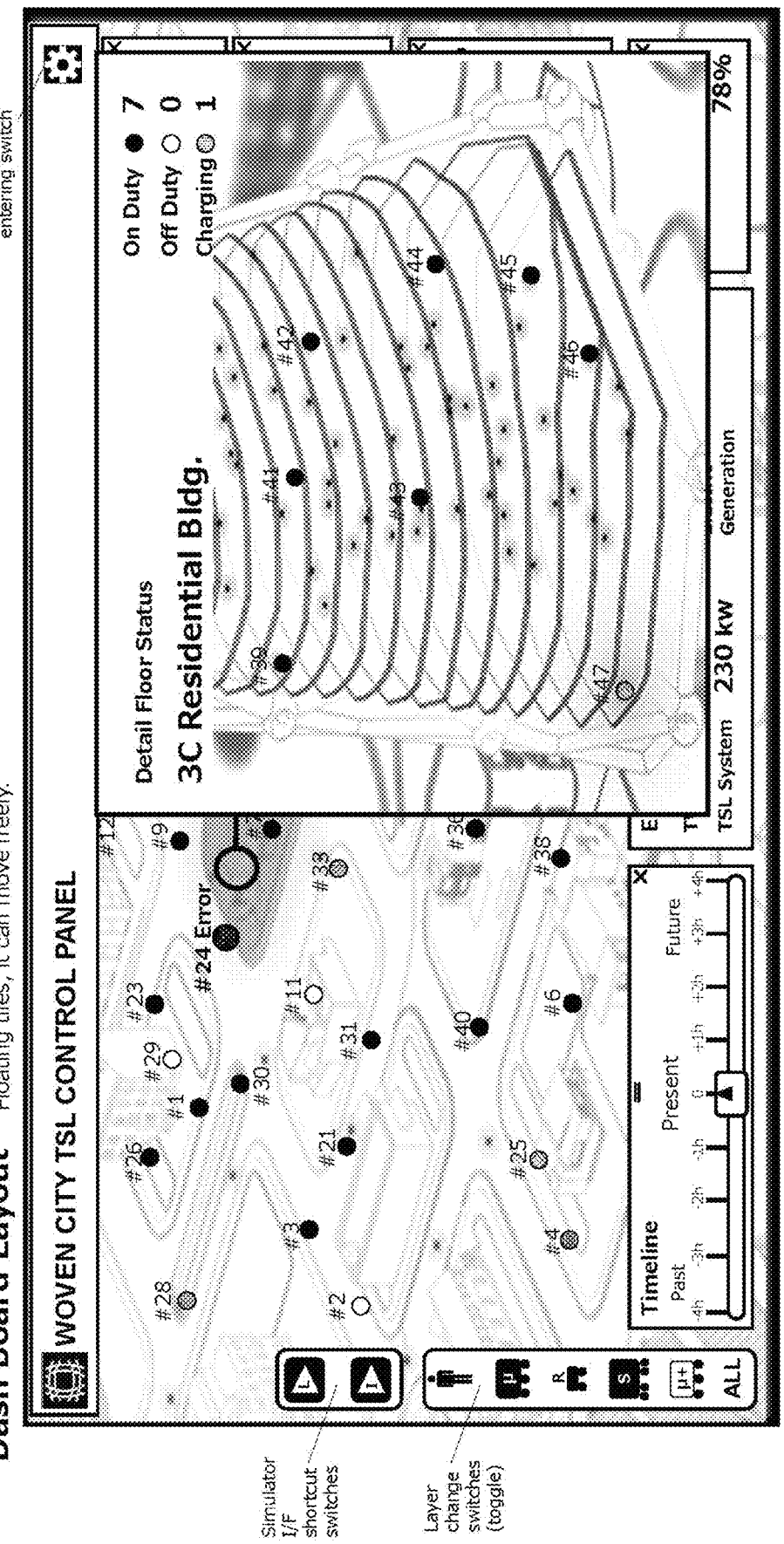
FIG. 6 is a conceptual diagram for explaining another example of the dashboard function of the service management device according to an embodiment of the present disclosure.

FIG. 6 shows a case where a certain building is specified by the operator. The information processing device 130 displays a building window indicating detailed information of the building specified by the operator on the display device 112. Typically, the building window is a pop-up window. For example, the building window represents a configuration (floor configuration) in the building. The configuration in the building is obtained from the service area configuration information 200. The building window may indicate the position of each autonomous robot 10 that exists in the building. The building window may indicate a distribution of the operating statuses (e.g., On Duty, Off Duty, Charging) of the autonomous robots 10 existing in the building.

Figure 7:
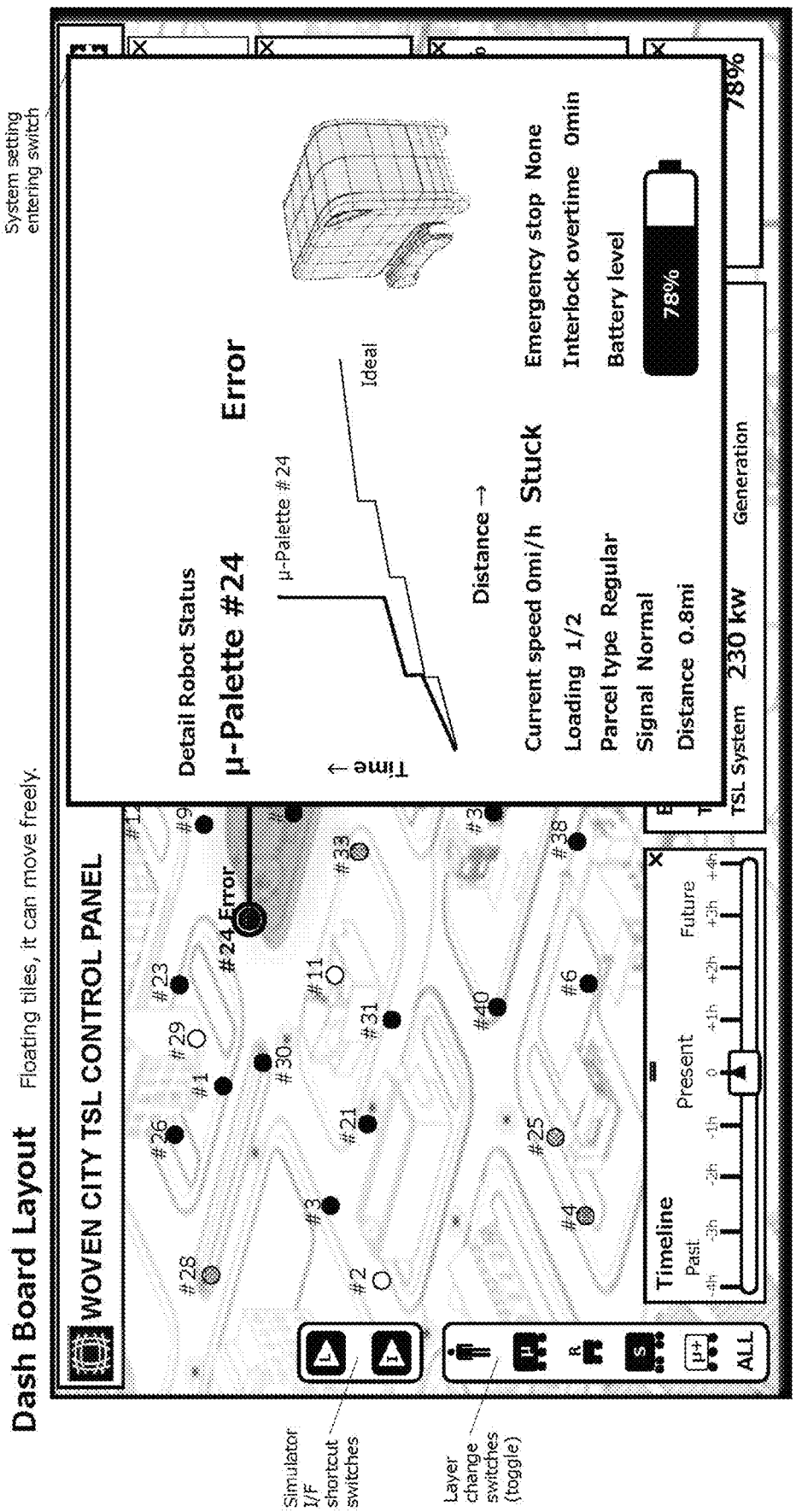
FIG. 7 is a conceptual diagram for explaining still another example of the dashboard function of the service management device according to an embodiment of the present disclosure.

FIG. 7 shows a case where a certain autonomous robot 10 is specified by the operator. Based on the service robot information 300, the information processing device 130 displays a "status window" indicating the status of the autonomous robot 10 specified by the operator on the display device 112. Typically, the status window is a pop-up window. For example, the status window indicates a speed, a travel distance, a loading weight, a parcel type, a remaining battery level, an error status, a failure status, and the like of the autonomous robot 10 specified by the operator. Thus, the operator is able to easily understand the operating status of the service in the service area A.

The status window may represent field-of-view information of the autonomous robot 10 specified by the operator. More specifically, the autonomous robot 10 is provided with the camera that images the surrounding situation. The status window may include an image (video) captured by the camera of the autonomous robot 10 specified by the operator. Thus, the operator is able to understand the situation around the autonomous robot 10.

The autonomous robot 10 autonomously travels from a point of departure to a destination along a travel route. The information processing device 130 may display and superpose the travel route of the autonomous robot 10 specified by the operator on the background map. The status window may indicate a history of the position along the travel route. For example, the status window includes a position history graph that represents the history of the position along the travel route.

Figure 8:
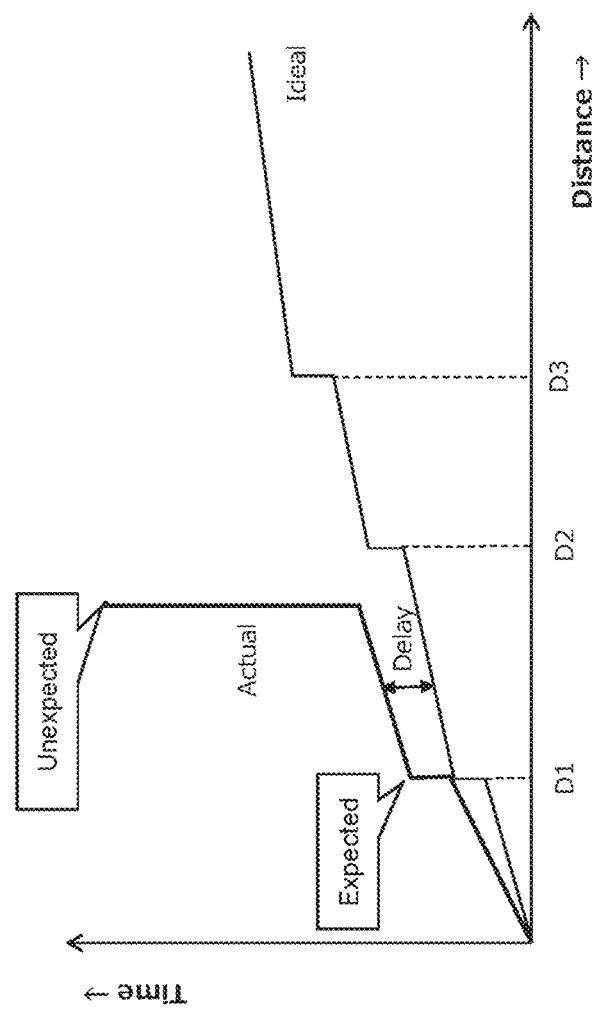
FIG. 8 is a conceptual diagram for explaining still another example of the dashboard function of the service management device according to an embodiment of the present disclosure.

FIG. 8 shows an example of the position history graph. A vertical axis represents time. A horizontal axis represents a travel distance from the point of departure along the travel route, that is, the position of the autonomous robot 10. When the autonomous robot 10 is moving, the position changes as time proceeds. The position history graph may indicate an ideal position and an actual position in a contrast manner. Comparing the ideal position and the actual position makes it possible to understand a degree of delay of the autonomous robot 10.

In some cases, the autonomous robot 10 utilizes an elevator. When the autonomous robot 10 waits for the elevator, the position of the autonomous robot 10 does not change over time. A position of the elevator on the travel route can be obtained from the service area configuration information 200. It is therefore possible to expect stopping of the autonomous robot 10 at the elevator position. In the example shown in FIG. 8, there are elevators at positions corresponding to the travel distances D1, D2, and D3. Stopping of the autonomous robot 10 at those positions is expected.

However, there may also be a case where the autonomous robot of 10 is unexpectedly stopped at an unexpected position due to some reason. In that case, as shown in FIG. 8, the position of the autonomous robot 10 is kept at the unexpected position without change for a defined period of time or more. Displaying the position history graph as shown in FIG. 8 makes it possible for the operator to easily understand that the autonomous robot 10 is unexpectedly stopped at an unexpected position for a defined period of time or more.

When an autonomous robot 10 is unexpectedly stopped at an unexpected position for a defined period of time or more, the information processing device 130 may display an alert regarding the stopped autonomous robot 10 on the display device 112. For example, as shown in the foregoing FIG. 5, the information processing device 130 highlights the autonomous robot 10 that is in the error status. The information processing device 130 may indicate the autonomous robot 10 in the error status by a large red circle. A text "Error" may be displayed together. Thus, the operator is able to easily understand presence of the autonomous robot 10 in the error status and its position.

The operator can specify (select) the autonomous robot 10 that is in the error status. In response to the specification by the operator, the information processing device 130 displays, on the display device 112, the status window indicating the status of the autonomous robot 10 that is in the error status. Thus, the operator is able to easily understand the detailed status of the autonomous robot 10 that is in the error status. As shown in the foregoing FIG. 7, the status window may include highlight texts such as "Error" and "Stuck." For example, the status window displays texts such as "Error" and "Stuck" in bold red. The status window may include the position history graph as shown in FIG. 8. The status window may include the image captured by the camera of the autonomous robot 10 that is in the error status. Thus, the operator is able to understand the situation around the autonomous robot 10 that is in the error status.

Figure 9:
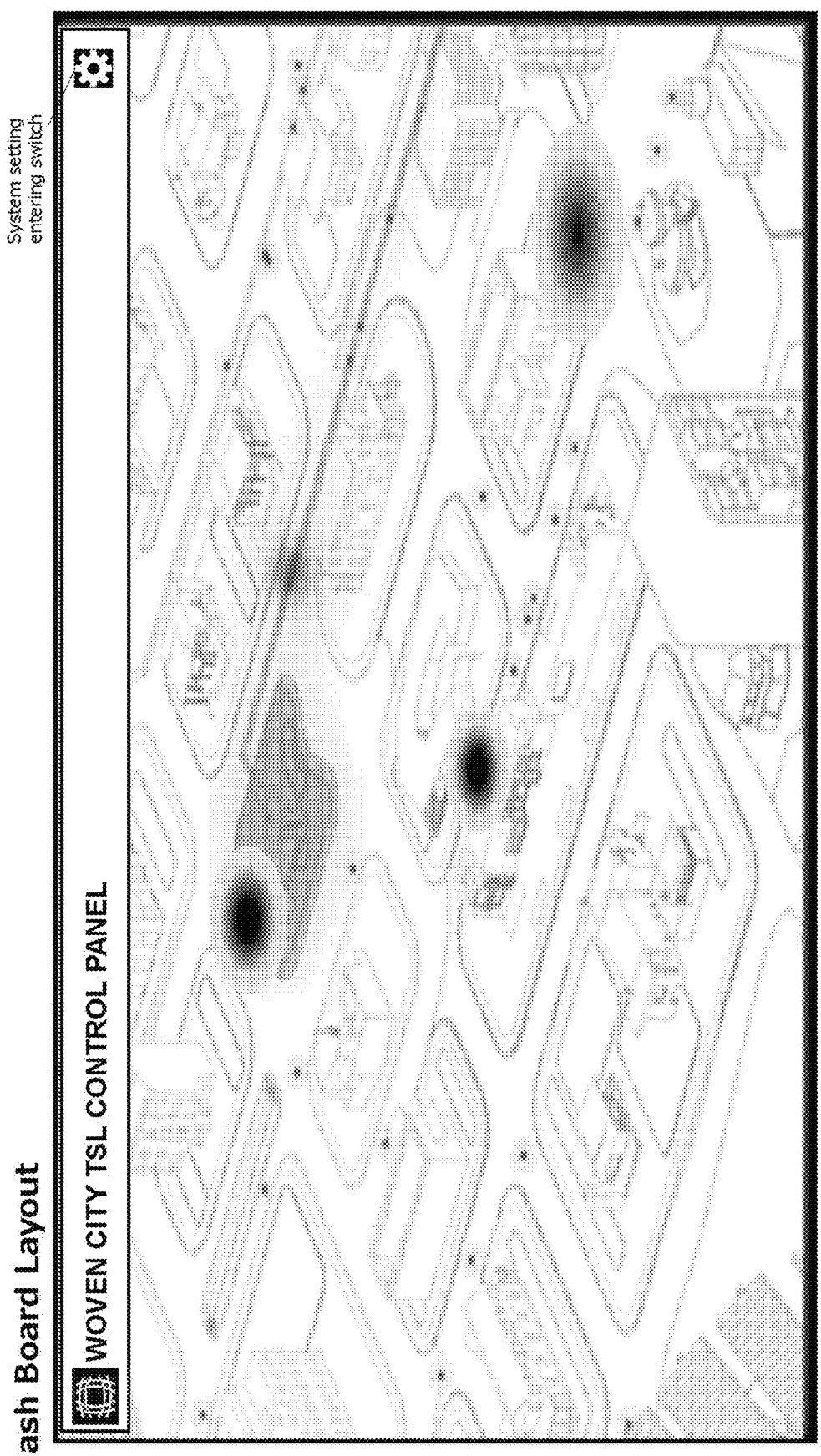
FIG. 9 is a conceptual diagram for explaining still another example of the dashboard function of the service management device according to an embodiment of the present disclosure.

The information processing device 130 may collect error occurrence positions where the unexpected stopping has occurred within the service area A, based on travel histories of a plurality of autonomous robots 10. Collecting the error occurrence positions in the service area A for a defined period makes it possible to generate a "heat map" indicating an error occurrence frequency distribution in the service area A. FIG. 9 shows an example oil such the heat map. The information processing device 130 may display the heat map indicating the error occurrence frequency distribution on the display device 112. Thus, the operator is able to easily understand a position where the error occurrence frequency is high.

The simulator function as described below is useful for investigating cause of the error occurrence or considering measures to reduce the error occurrence.

4. Simulator Function of Service Management Device

The information processing device 130 (the simulator unit 150) performs a simulation of the service delivered in the service area A. For example, the information processing device 130 performs a multi-agent simulation of autonomous travel of a plurality of autonomous robots 10 in the service area A. The information processing device 130 displays the simulation result on the display device 112.

The information processing device 130 may display, on the display device 112, a "simulation setting screen" used by the operator to specify a simulation condition. The operator uses the operator interface 110 (the input device 111) to specify the simulation condition on the simulation configuration screen. The information processing device 130 receives the simulation condition specified by the operator and performs the simulation in accordance with the specified simulation condition.

Figure 10:
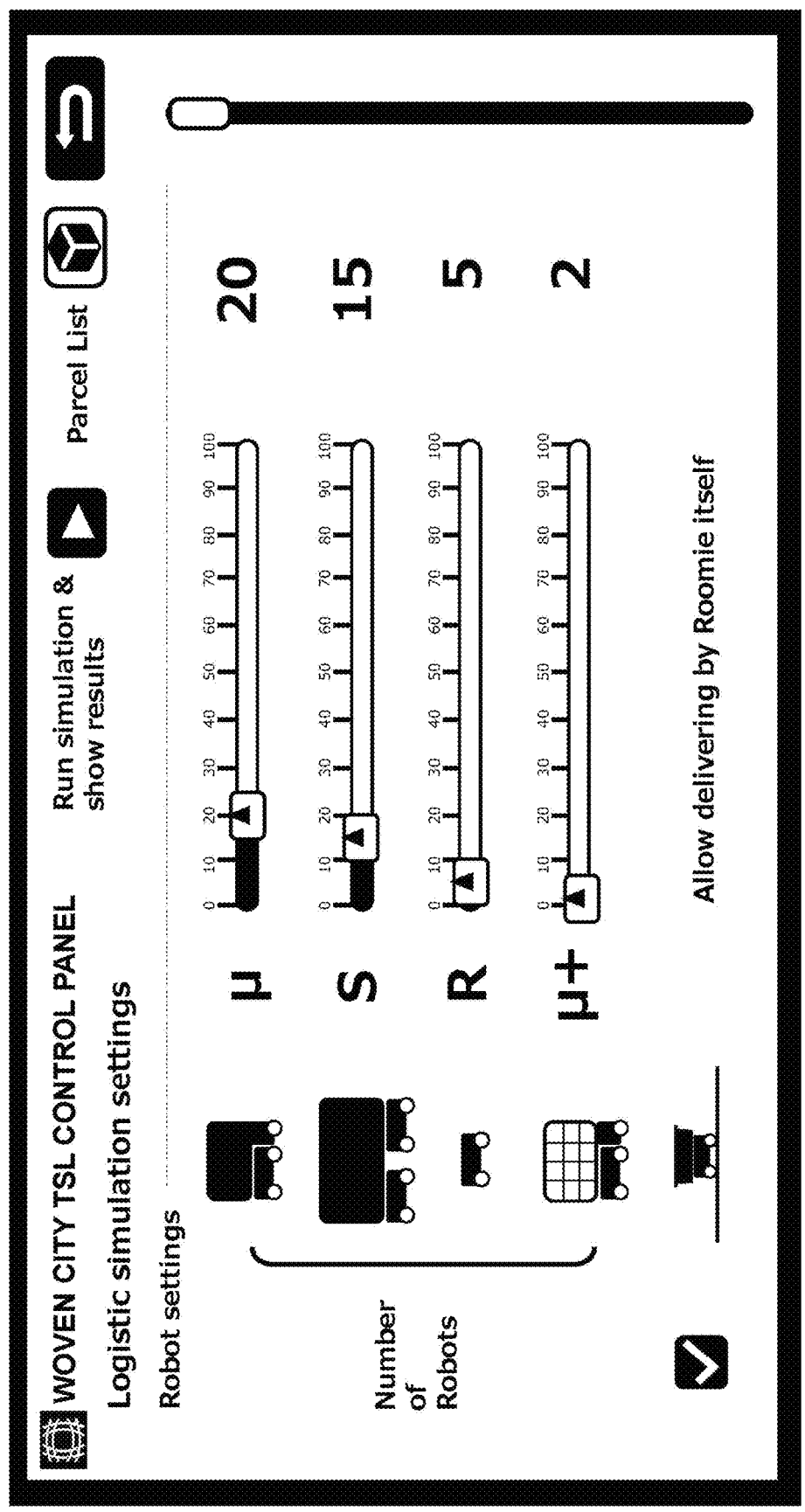
FIG. 10 is a conceptual diagram for explaining an example of a simulator function of the service management device according to an embodiment of the present disclosure.

FIG. 10 is a conceptual diagram showing an example of the simulation setting screen. The simulation condition may include the number and types of the autonomous robots 10. The operator is able to specify the number of the autonomous robots 10 for each type on the simulation setting screen. The simulation condition may include whether to allow or prohibit delivery by a small autonomous robot 10 (Roomie). The operator is able to specify whether to allow or prohibit the delivery by the small autonomous robot 10.

Figure 11:
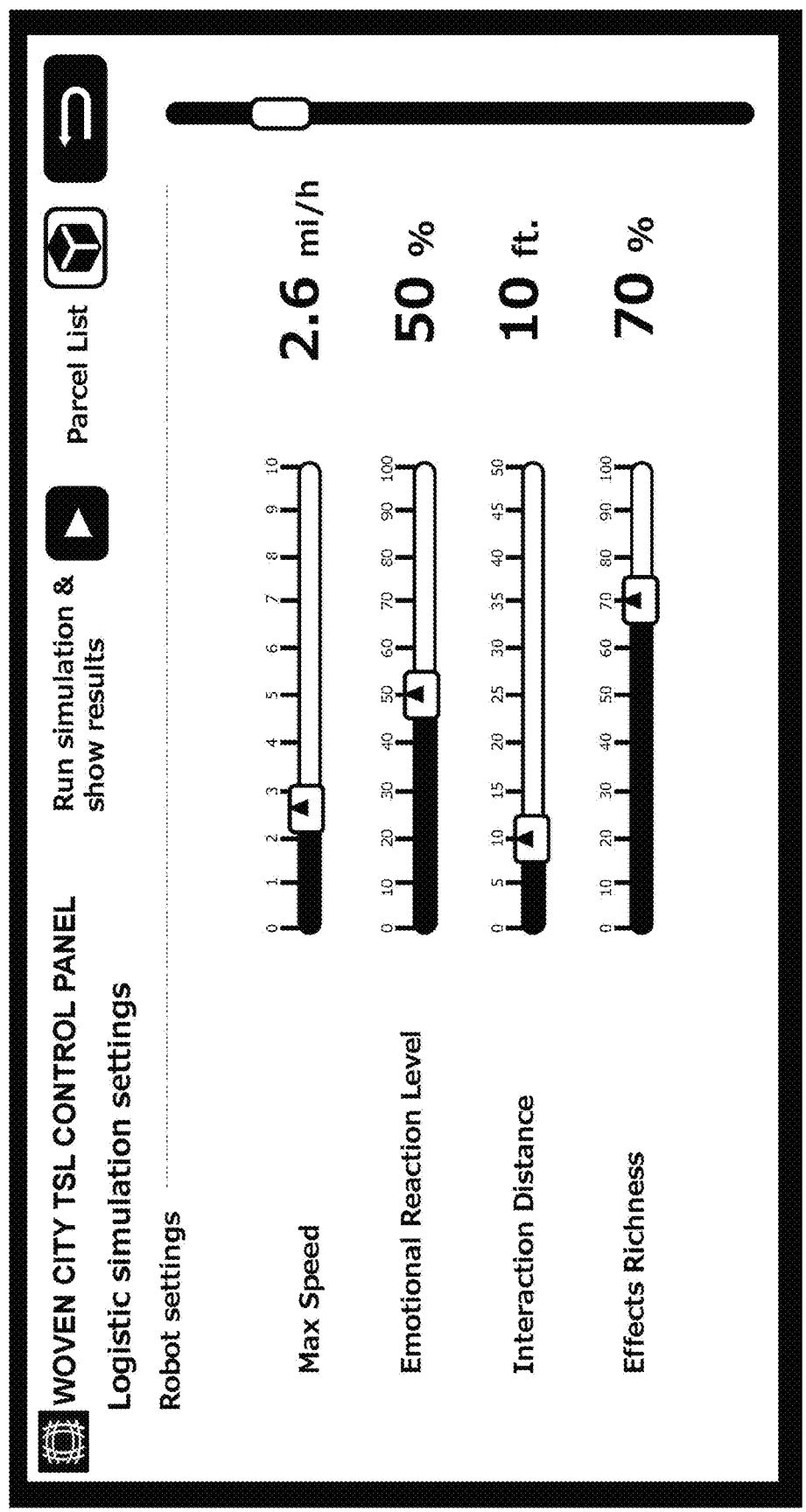
FIG. 11 is a conceptual diagram for explaining another example of the simulator function of the service management device according to an embodiment of the present disclosure.

FIG. 11 is a conceptual diagram showing another example of the simulation setting screen. The simulation condition may include the performance of the autonomous robot 10. For example, the performance of the autonomous robot 10 includes a maximum speed, an emotional reaction level, an interaction distance, effects richness, and the like. For example, the autonomous robot 10 is equipped with a display for displaying a variety of information. Messages for people (e.g., "Hello", "Thank you", and the like) are displayed on the display. The emotional reaction level indicates a frequency at which such the messages for people are delivered. The operator is able to specify the performance of the autonomous robot 10 on the simulation setting screen.

Figure 12:
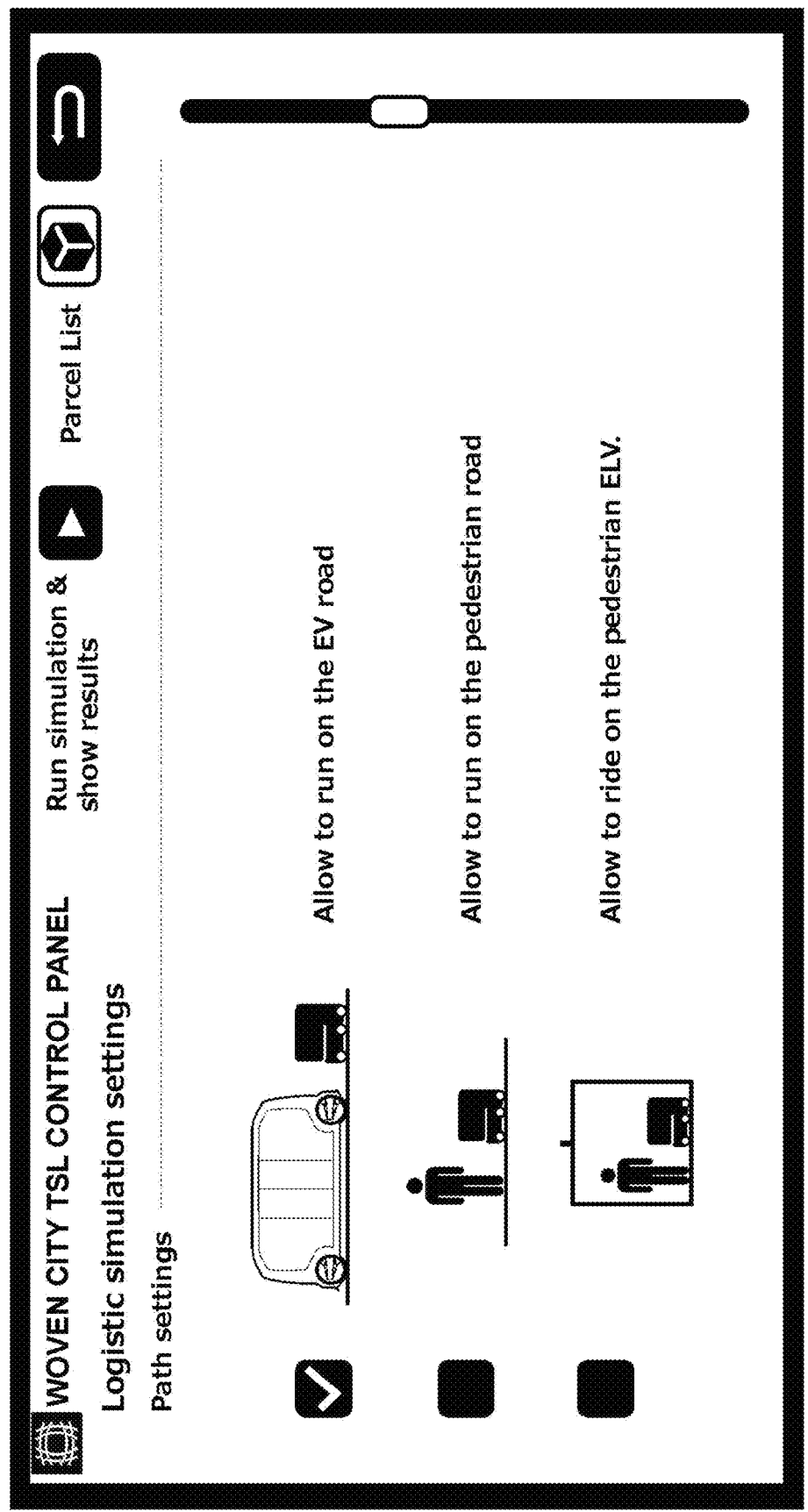
FIG. 12 is a conceptual diagram for explaining still another example of the simulator function of the service management device according to an embodiment of the present disclosure.

FIG. 12 is a conceptual diagram showing still another example of the simulation setting screen. The simulation condition may include ON/OFF of a regulation (restriction) imposed on the autonomous robot 10. Examples of ON/OFF of the regulation imposed on the autonomous robot 10 are as follows.

[A] whether to prohibit or allow the autonomous robot 10 to travel on a vehicular road in which other mobilities (e.g., car, bus) travel.

[H] whether to prohibit or allow the autonomous robot 10 to travel on a pedestrian road.

[C] whether to prohibit or allow the autonomous robot 10 to take a pedestrian elevator.

The simulation condition includes at least one of the ON/OFF of the regulations. The operator is able to specify ON/OFF of the regulation imposed on the autonomous robot 10 on the simulation setting screen.

Figure 13:
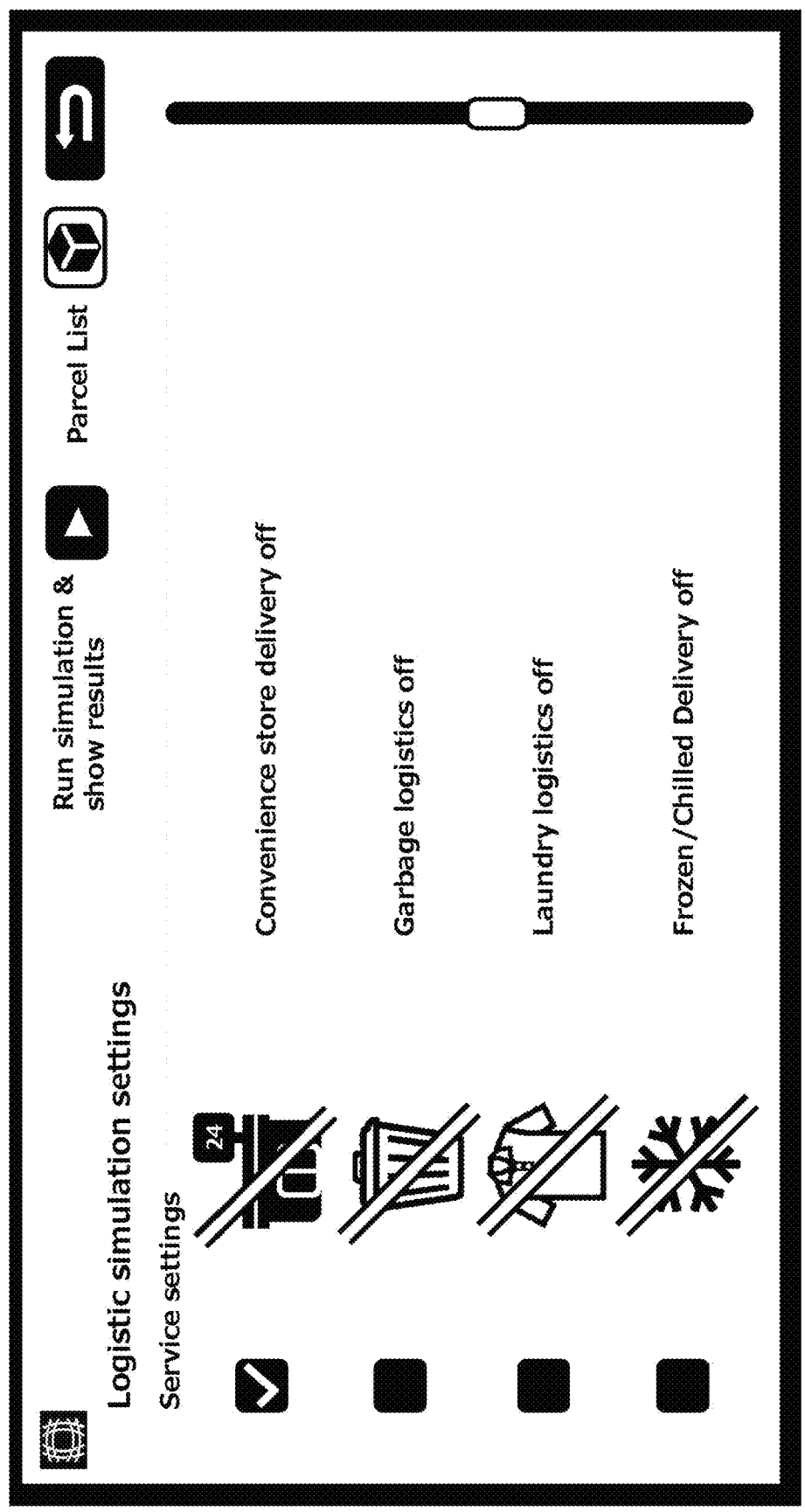
FIG. 13 is a conceptual diagram for explaining still another example of the simulator function of the service management device according to an embodiment of the present disclosure.

FIG. 13 is a conceptual diagram showing still another example of the simulation setting screen. In some cases, plural types of services are delivered in the service area A. In that case, the simulation condition may include ON/OFF of each of the plural types of services. In the example shown in FIG. 13, the plural types of services related to the logistics service include a convenience store delivery service, a garbage collection service, a laundry service, and a frozen/chilled delivery service. The operator is able to specify ON/OFF of each of the plural types of services on the simulation setting screen.

Figure 14:
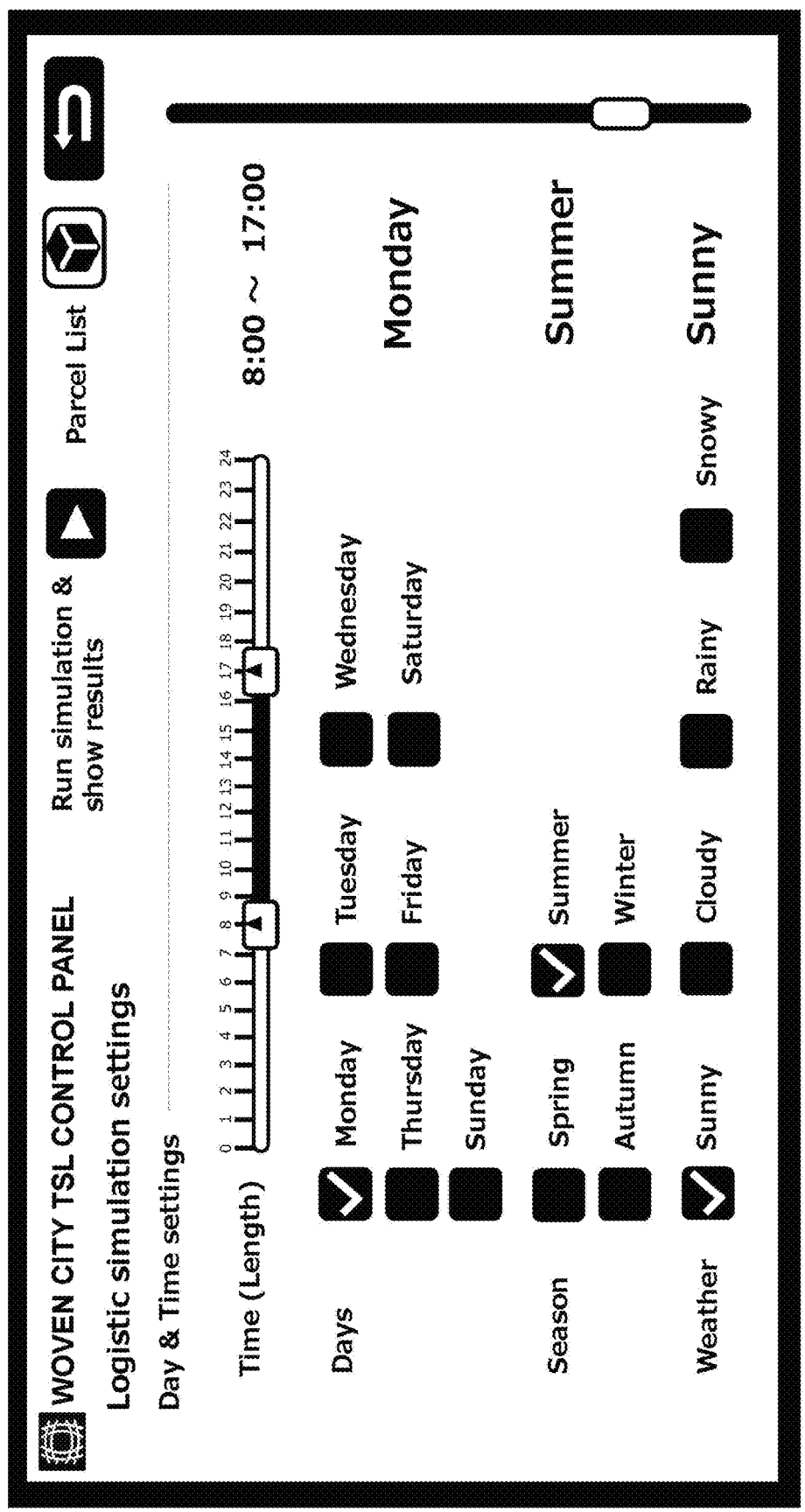
FIG. 14 is a conceptual diagram for explaining still another example of the simulator function of the service management device according to an embodiment of the present disclosure.

FIG. 14 is a conceptual diagram showing still another example of the simulation setting screen. The simulation condition may include at least one of time, day, season, and weather. The operator is able to specify at least one of time, day, season, and weather on the simulation setting screen.

Figure 15:
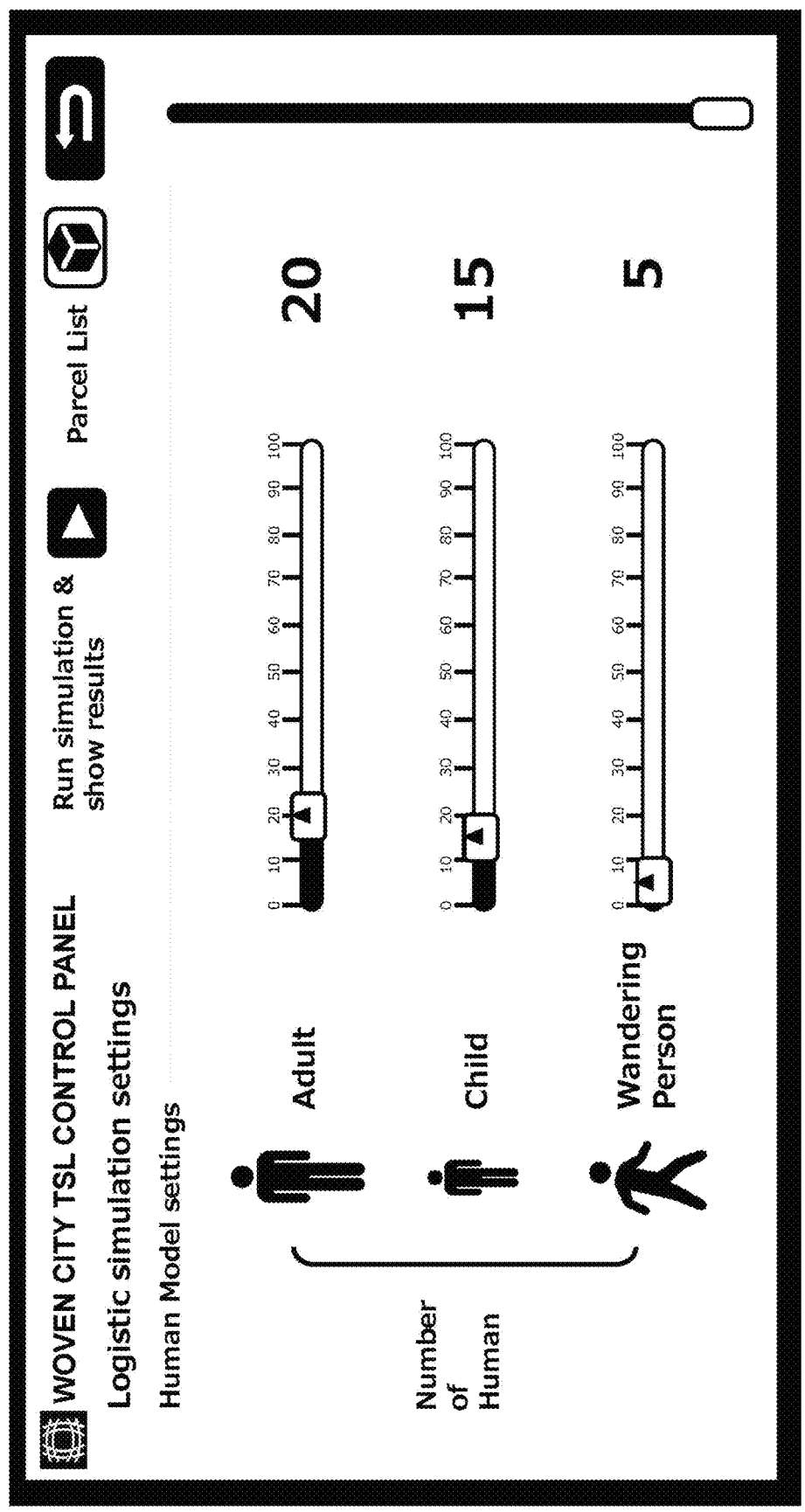
FIG. 15 is a conceptual diagram for explaining still another example of the simulator function of the service management device according to an embodiment of the present disclosure.

FIG. 15 is a conceptual diagram showing still another example of the simulation setting screen. The simulation condition may include types and the number of people in the service area A. The operator is able to specify the number of people for each type on the simulation setting screen.

It should be noted that a simulation run button (Run simulation) may be displayed on the simulation setting screen. The operator is able to start the simulation by selecting the simulation run button.

Figure 16:
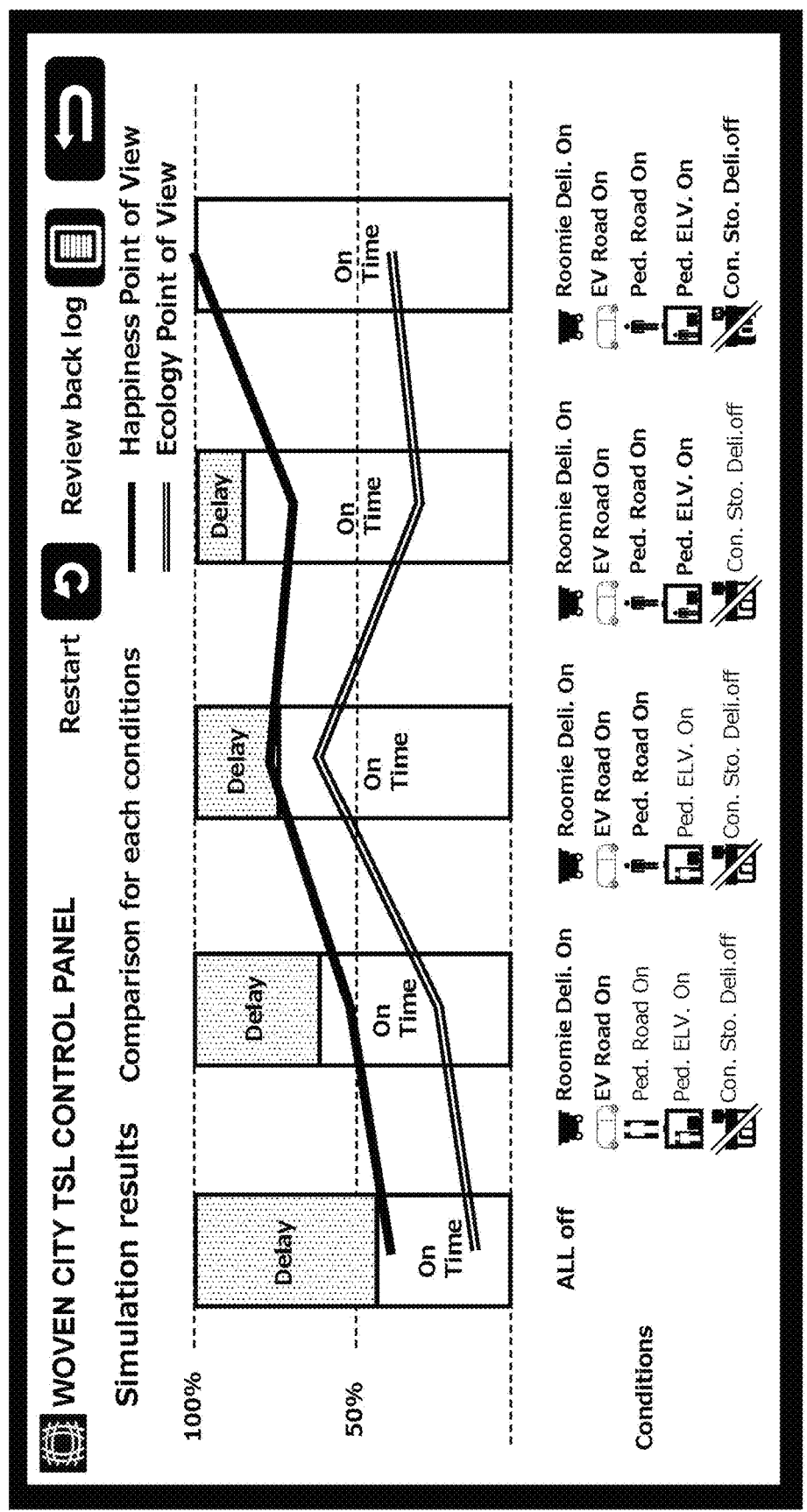
FIG. 16 is a conceptual diagram for explaining still another example of the simulator function of the service management device according to an embodiment the present disclosure.

FIG. 16 shows an example of the simulation result. For example, a ratio at which delivery by the autonomous robot 10 (logistics robot) is performed on time is estimated. A ratio at which the delivery is not performed on time is a delay occurrence rate. In the example shown in FIG. 16, five patterns of simulation conditions are prepared, and five patterns of simulation results in the cases of the respective simulation conditions are displayed concurrently. Making a comparison of the five patterns of simulation results makes it possible for the operator to analyze influence of each simulation condition and to consider an optimum service delivery condition. Not only "low delay (high user satisfaction)" but also "environmentally friendly (Ecology)" is conceivable as a criterion for the optimum service delivery condition. It is preferable to consider the optimum service delivery condition from various points of view.

According to the present embodiment, as described above, the simulation setting screen used by the operator to specify the simulation condition is displayed on the display device 112. The operator is able to freely set the simulation condition through the simulation setting screen. Then, the simulation is performed in accordance with the simulation condition specified by the operator, and the simulation result is displayed on the display device 112. Based on the simulation result, the operator is able to analyze and consider the service delivered in service area A. In addition, the operator is able to change the simulation condition as necessary.

As a purpose of the simulation, various examples are considered. For example, as shown in FIG. 16, it is possible to estimate the delay of the logistics service while variously changing the simulation condition. Moreover, it is possible to consider the optimum service delivery condition by variously changing the simulation condition.

As another example, it is possible to investigate cause of the error occurrence of the autonomous robot 10 (see FIGS. 7 to 9) by variously changing the simulation condition. Moreover, it is possible to consider measures to reduce the error occurrence by variously changing the simulation condition.

As still another example, it is possible to consider an optimum city configuration by variously changing the simulation condition. For example, it is possible to consider an optimum road layout and an optimum road type by variously changing a road layout and a road type.

As still another example, performing the simulation makes it possible to find problems on the service operation. In addition, performing the simulation makes it possible to imagine what kind of impression people have of the behavior of the autonomous robot 10 and the like.

What is claimed is:

1. A service management device that manages a service delivered in a predetermined area, the service management device comprising:
   an operator interface including a display that displays information for an operator and receiving an input from the operator; and
   one or more processors configured to display, on the display, an operating status of the service delivered in the predetermined area, wherein
   the one or more processors are further configured to:
      communicate with an autonomous robot used for delivering the service in the predetermined area to acquire, from the autonomous robot, service robot information indicating at least a position and a status of the autonomous robot;
      display a map of the predetermined area and the position of the autonomous robot on the display, based on the service robot information; and
      when the autonomous robot displayed on the display is specified by the operator through the operator interface, display a status window indicating the status of the autonomous robot specified by the operator on the display, based on the service robot information;
      wherein the status window indicating the status of the autonomous robot comprises a position history graph indicating time on a first axis and position on a second axis.

2. The service management device according to claim 1, wherein
   the status window further indicates a history of the position of the autonomous robot specified by the operator.

3. The service management device according to claim 1, wherein
   the autonomous robot is provided with a camera imaging a situation around the autonomous robot,
   the service robot information further includes an image captured by the camera, and
   the status window further includes the image captured by the camera of the autonomous robot specified by the operator.

4. The service management device according to claim 1, wherein
   the autonomous robot autonomously travels along a travel route, and
   when the autonomous robot is unexpectedly stopped at an unexpected position for a defined period of time or more, the one or more processors are further configured to display an alert regarding the unexpectedly stopped autonomous robot on the display.

5. The service management device according to claim 1, wherein
   the autonomous robot autonomously travels along a travel route,
   an error occurrence position is an unexpected position at which the autonomous robot is unexpectedly stopped for a defined period of time or more, and
   the one or more processors are further configured to collect the error occurrence position for a defined period and to display a heat map indicating an error occurrence frequency distribution on the display.

* * * * *